(12) United States Patent
Stoyanov et al.

(10) Patent No.: US 11,976,732 B2
(45) Date of Patent: *May 7, 2024

(54) LOW FRICTION, WEAR RESISTANT PISTON SEAL

(71) Applicant: RTX Corporation, Farmington, CT (US)

(72) Inventors: Pantcho P. Stoyanov, West Hartford, CT (US); Kelly M. Harrington, Deerfield, NH (US)

(73) Assignee: RTX Corporation, Farmington, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/676,606

(22) Filed: Feb. 21, 2022

(65) Prior Publication Data

US 2022/0325797 A1   Oct. 13, 2022

Related U.S. Application Data

(63) Continuation of application No. 16/375,954, filed on Apr. 5, 2019, now Pat. No. 11,255,432.

(51) Int. Cl.
 *F16J 9/26* (2006.01)
(52) U.S. Cl.
 CPC ..................... *F16J 9/26* (2013.01)
(58) Field of Classification Search
 CPC ................ F16J 9/00; F16J 9/12; F16J 9/26
 See application file for complete search history.

(56) References Cited

U.S. PATENT DOCUMENTS

| | | | |
|---|---|---|---|
| 4,384,822 A | 5/1983 | Schweikl et al. | |
| 6,186,508 B1 | 2/2001 | Zajchowski et al. | |
| 7,181,843 B1 | 2/2007 | Tabbita et al. | |
| 9,945,295 B2 | 4/2018 | Porter et al. | |
| 2006/0230763 A1 | 10/2006 | Johnson et al. | |
| 2011/0312860 A1 | 12/2011 | Mathew et al. | |
| 2016/0169020 A1 | 6/2016 | Ryan et al. | |
| 2018/0291815 A1 | 10/2018 | Munson et al. | |
| 2019/0017401 A1 | 1/2019 | Stoyanov | |
| 2020/0148340 A1 | 5/2020 | Poteet et al. | |

FOREIGN PATENT DOCUMENTS

| | | | |
|---|---|---|---|
| CN | 101954676 B | 10/2013 | |
| CN | 107849703 A * | 3/2018 | ......... C23C 14/0641 |
| DE | 102008017270 B3 * | 6/2009 | ............ C25D 15/02 |
| DE | 102017130965 A1 | 6/2019 | |
| WO | WO-2013135325 A1 * | 9/2013 | ........... C23C 28/322 |

OTHER PUBLICATIONS

European search report for application No. 20 16 6806.8 dated Sep. 9, 2020.

European Office Action dated Nov. 21, 2023 for corresponding application No. EP20166806.8.

* cited by examiner

*Primary Examiner* — Gilbert Y Lee

(74) *Attorney, Agent, or Firm* — Bachman & LaPointe, P.C.

(57) ABSTRACT

A piston seal assembly for a gas turbine engine includes a seal composed of a nickel-based superalloy; a component in contact with the seal and defining a seal-counterface; and a coating on the seal at the seal-counterface, wherein the coating is a metal alloy binder phase and a hard particle phase distributed through the binder phase.

18 Claims, 2 Drawing Sheets

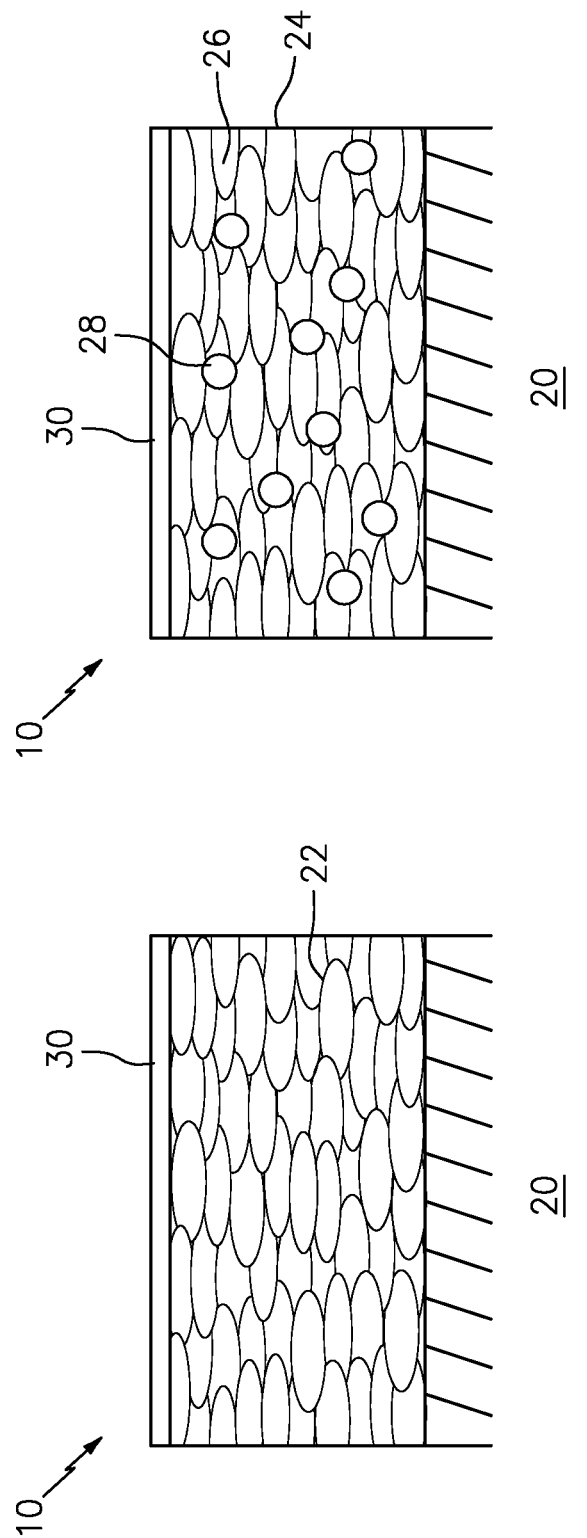

LOW FRICTION, WEAR RESISTANT PISTON SEAL

CROSS REFERENCE TO RELATED APPLICATION

This application is a continuation application of U.S. patent application Ser. No. 16/375,954, filed Apr. 5, 2019.

BACKGROUND OF THE INVENTION

The invention relates to a piston seal for a gas-turbine engine, more particularly to a low friction, wear resistant piston seal for a mid-turbine-frame seal location of a gas turbine engine.

Piston rings and seals are utilized in numerous areas in gas turbine engines and can be utilized in areas such as the mid-turbine-frame seal areas which are subject to very high temperatures (approaching 1,600° F.) and also subject to vibratory motion which can lead to significant wear.

One configuration of piston rings for piston seal assemblies is made with nickel-based alloys such as large grain nickel-based superalloy. These materials can be age hardened austenitic nickel-based superalloys which improve creep resistance of the piston ring. However, piston rings made from this nickel-based superalloy still show significant wear to the ring as well as increased wear to the counterface. Specifically, it was found that chromia and alumina formed on the surface of the piston ring, when operated at high temperatures, and this resulted in increased friction leading to additional wear. Thus, the need remains for a piston ring suitable for use under the aforesaid conditions which has acceptable creep and wear resistance.

SUMMARY OF THE INVENTION

A piston seal assembly for a gas turbine engine is provided according to this disclosure, and comprises a seal comprised of a nickel-based superalloy; a component in contact with the seal and defining a seal-counterface; and a coating on the seal at the seal-counterface, wherein the coating comprises a metal alloy binder phase and a hard particle phase distributed through the binder phase.

According to a non-limiting embodiment, the hard particle phase comprises particles of a material selected from the group consisting of $Cr_2O_3$, $Al_2O_3$, carbides, chromium carbides, silicon carbides and combinations thereof.

According to another non-limiting embodiment, the hard particle phase comprises particles of $Cr_2O_3$.

According to a further non-limiting embodiment, the hard particle phase comprises hard particles having a particle size of between 5 and 150 µm.

According to a non-limiting embodiment, the metal alloy binder phase comprises a Co—Cr—W alloy.

According to another non-limiting embodiment, the metal alloy binder phase contains between 28 and 32 wt. % chromium, between 3.5 and 5.5 wt. % of tungsten, between 0.9 and 1.4 wt. % carbon, up to 3.0 wt. % nickel, up to 2.0 wt. % silicon, up to 3.0 wt. % iron, up to 2.0 wt. % manganese, up to 1.5 wt. % molybdenum and balance cobalt.

According to a further non-limiting embodiment, the coating contains between 60 and 80% volume of the metal alloy binder phase and between 20 and 40% volume of the hard particle phase.

According to a non-limiting embodiment, the coating has a thickness of between 0.0005 in. and 0.005 in.

According to another non-limiting embodiment, the seal comprises an age hardening austenitic nickel-based superalloy.

According to a further non-limiting embodiment, the seal has non-contact surfaces that are not in contact with the component, and the coating is on the seal at the seal-counterface, and not on the non-contact surfaces.

According to a non-limiting embodiment, the component comprises two components, with the seal mounted between the two components to define two seal-counterfaces, and the coating is on the seal at locations corresponding to both of the two seal-counterfaces.

According to another non-limiting embodiment, the two components comprise a mid-turbine-frame (MTF) vane and an outer air seal.

According to a non-limiting embodiment, a seal for a gas turbine engine, comprises a seal comprised of a nickel-based superalloy and a coating on the seal, wherein the coating comprises a metal alloy binder phase and a hard particle phase distributed through the binder phase.

According to another non-limiting embodiment, the hard particle phase comprises particles of a material selected from the group consisting of $Cr_2O_3$, $Al_2O_3$, carbides, chromium carbides, silicon carbides and combinations thereof.

According to a further non-limiting embodiment, the hard particle phase comprises particles of $Cr_2O_3$.

According to a non-limiting embodiment, the hard particle phase comprises hard particles having a particle size of between 5 and 150 µm.

According to another non-limiting embodiment, the metal alloy binder phase comprises a Co—Cr—W alloy.

According to a further non-limiting embodiment, the metal alloy binder phase contains between 28 and 32 wt. % chromium, between 3.5 and 5.5 wt. % of tungsten, between 0.9 and 1.4 wt. % carbon, up to 3.0 wt. % nickel, up to 2.0 wt. % silicon, up to 3.0 wt. % iron, up to 2.0 wt. % manganese, up to 1.5 wt. % molybdenum and balance cobalt. According to a non-limiting embodiment, the coating contains between 60 and 80% volume of the metal alloy binder phase and between 20 and 40% volume of the hard particle phase.

According to a further non-limiting embodiment, the coating has a thickness of between 0.0005 in. and 0.005 in.

The details of one or more embodiments of the invention are set forth in the accompanying drawings and the description below. Other features, objects, and advantages of the invention will be apparent from the description and drawings, and from the claims.

BRIEF DESCRIPTION OF THE DRAWINGS

A detailed description of preferred embodiments of the invention follows, with referenced to the attached drawings, wherein:

FIG. 2 schematically illustrates a coated seal member and;

FIG. 3 schematically illustrates a coated seal member in accordance with one non-limiting embodiment of the present disclosure.

Like reference numbers and designations in the various drawings indicate like elements.

DETAILED DESCRIPTION

Figure 1:
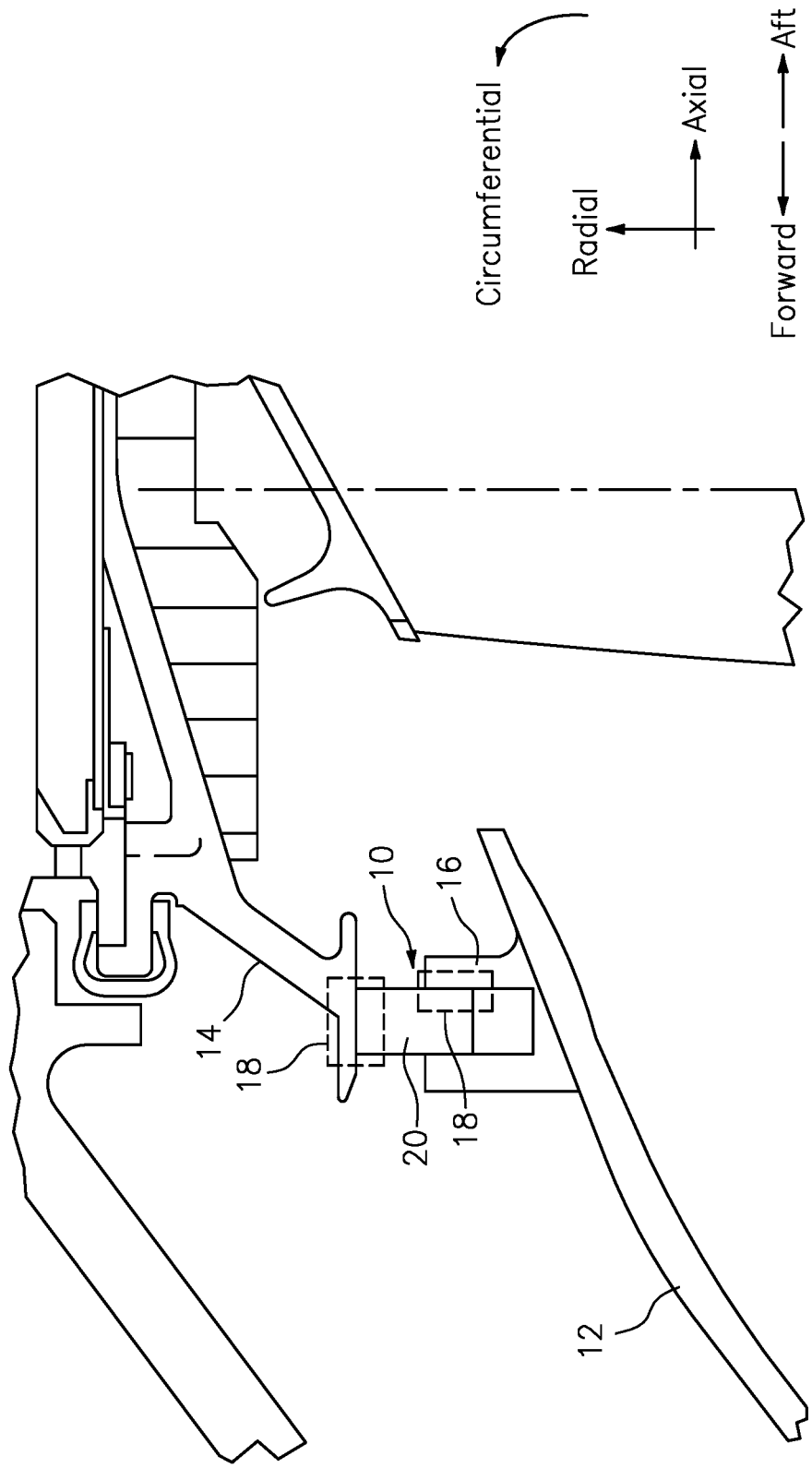
FIG. 1 shows a mid-turbine-frame (MTF) piston seal assembly.

The present invention relates to a piston seal assembly and, more particularly, to a piston seal assembly for a gas turbine engine which can be utilized in areas of high temperature and high vibratory motion. The seal assembly as disclosed herein possesses excellent creep and wear resistance at high temperatures.

FIG. 1 shows a mid-turbine-frame (MTF) location of a gas-turbine engine, and shows a seal assembly 10 positioned between an MTF vane 12 and an outer air seal 14. MTF vane 12 can suitably have a counterface component 16 for holding a seal such as a seal ring, illustrated as seal body 20, such that seal body 20 is in sealing contact with counterface component 16 and also with outer air seal 14.

Areas of contact between seal body 20 and components such as counterface component 16 or outer air seal 14 establish seal-counterface areas 18 between the seal and these structures, and these seal-counterface areas are subjected to significant vibratory motion, which, as mentioned above can lead to problems of creep and high wear, particularly when subjected to high temperatures, for example approaching 1600° F.

FIG. 1 shows only a portion of the gas turbine engine for which the seal assembly can be utilized, and radial, axial and circumferential directions as well as forward and aft vectors related to the engine are all as shown in FIG. 1.

The present disclosure relates to a coating strategy which is utilized on seal body 20 at the seal-counterface areas 18 to address creep and wear, especially wear, at these areas when operated at high temperatures.

FIG. 2 shows an enlarged portion of a seal body 20 of a seal assembly 10 wherein the seal body 20 has a coating 22 applied thereto. In the configuration shown in FIG. 2, coating 22 is a metal alloy phase such as Stellite 31 or Tribaloy 800, which can be applied to a surface of seal body 20 which can be a nickel-based superalloy, more particularly, an age hardening austenitic nickel-based superalloy such as Waspaloy™. Seal bodies made from this material have been found to help address creep resistance, but this also leads to increased problems due to wear, and coatings such as those shown in FIG. 2 do not adequately address this wear.

FIG. 3 shows a coating 24 on a portion of a seal body 20 in accordance with one-non-limiting configuration of the present disclosure. Seal body 20 can have this coating 24 applied at portions or areas corresponding to seal-counterface areas 18, where seal body 20 contacts components such as counterface component 16 and outer air seal 14. Coating 24 comprises a metal alloy binder phase 26 as well as a hard particle phase 28 which is distributed through the binder phase 26. It has been found that while the underlying seal body material addresses issues of creep resistance, the coating having metal alloy binder phase 26 with hard particle phase 28 provides a desired level of wear resistance to the seal body 20 such that both the seal body 20 and counterface components such as counterface component 16 or outer air seal 14 are protected from excessive wear due to the high temperature, high vibratory conditions surrounding the seal.

In one non-limiting configuration, the seal body 20 can be made of or comprise a nickel-based superalloy, more specifically an age hardening austenitic nickel-based superalloy, one suitable example of which is Waspaloy™, although other nickel-based superalloys may be suitable as well, particularly those with a large grain size. The binder phase 26 of coating 24 can comprise a metal alloy such as Stellite 31 or Tribaloy T-800, or other Co—Cr—Mo or Co—Cr—W types of coating. These Co-based coatings may provide wear resistance, but this resistance is enhanced via the addition of hard particles 28.

In one non-limiting configuration, the nickel-based superalloy of the metal alloy binder phase 26 can be a Co—Cr—W alloy, and can have a composition as shown in Table 1 below.

TABLE 1

| Composition of the binder phase | | | | | | | | |
|---|---|---|---|---|---|---|---|---|
| Cobalt | Nickel | Silicon | Iron | Manganese | Chromium | Molybdenum | Tungsten | Carbon |
| Bal | 3.00 max | 2.00 max | 3.00 max | 2.00 max | 28-00-32.00 | 1.50 max | 3.50-5.50 | 0.90-1.40 |

Note that amounts shown in Table 1 are weight percentages.

The hard particle phase in accordance with this disclosure adds to the wear resistance and, thereby reduces wear both to the seal and the counterface component. In one non-limiting configuration, the hard particle phase can be particles selected from the group consisting of $Cr_2O_3$, $Al_2O_3$, carbides, chromium carbides, silicon carbides and combinations thereof. One non-limiting but particularly suitable particle phase is $Cr_2O_3$. These hard particles can have a particle size distribution wherein the particles have diameters between 5 and 150 μm and wherein, within this range, at least 85% volume of the particles have particle sizes between 10 and 20 μm.

The coating in accordance with this disclosure can contain between about 30 and about 80 volume percent of the metal alloy binder, and between 70 and 20 volume percent of the hard particle phase, wherein the hard particle phase is distributed through the metal alloy phase. A further non-limiting configuration has a coating with between 60 and 80 volume percent binder and between 40 and 20 volume percent particles, and an ideal configuration is 70 percent volume binder and 30 percent volume particles.

Coating 24 can advantageously be applied to the seal body 20 having a thickness of between about 0.0005 in. and about 0.005 in.

Coating 24 can be applied to seal body 20 in a number of different ways, but one suitable non-limiting application method is a spray coating such that the coating is deposited to the seal surface by means of a high velocity oxygen fuel (HVOF) flame spraying process. Spraying parameters for one non-limiting example of an application method can suitably be as shown below.

TABLE 2

| Spray parameters using a JP5000 HVOF torch | |
|---|---|
| Parameter | Value |
| Barrel length (mm) | 102 |
| O2 flux (Sl/min) | 902 |
| Kerosene flux (l/min) | 0.379 |
| Powder carrier gas (Sl/min) | 10.5 |

TABLE 2-continued

Spray parameters using a JP5000 HVOF torch

| Parameter | Value |
|---|---|
| Feeding disk revolution speed (rpm) | 270 |
| Spray distance (mm) | 380 |
| Gun traverse speed (mm/min) | 500 |

It should be appreciated that a piston seal according to the present disclosure, which can typically be in a ring form, can be positioned between various components, such as in the counterface component 16 and contacting outer air seal 14 as shown in FIG. 1. Seal body 20 will have areas where contact is made with other components, and other non-contact areas which are not in contact with any other structures. While the entire seal body could be coated with the coating composition disclosed herein, it may be preferable in order to conserve resources and avoid excessive weight to apply the coating to the seal only in the areas of contact with the other components, specifically at the seal-counterfaces 18.

FIGS. 2 and 3 each show an oxide layer 30 which may be present over coating 22, 24. This oxide layer 30 can be positively applied to the coating during manufacture, or may result from some initial use or break in of the seal assembly, and may in one non-limiting configuration be a lubricating oxide such as a cobalt-based oxide layer.

The lubrication strategy disclosed herein, utilizing a metal alloy binder phase and a hard particle phase distributed through the metal alloy binder phase, provides wear resistance even at high temperatures, and thereby produces low friction, wear resistant piston rings or seals capable of operating efficiently in high pressure turbine static sealing applications. This will significantly increase endurance life of engine components, and may significantly reduce overhaul costs by reducing the number of parts, in particularly the more expensive counterface parts, that can conventionally be stripped due to wear and thermal damage issues, for example caused by frictional heating.

The present disclosure is made in terms of a seal assembly wherein the seal is between two components at a mid-turbine-frame (MTF) location, for example in the high pressure turbine. It should be appreciated that the seal assembly, as well as the specific coating and lubrication strategy utilized in the disclosed seal assembly could have useful application in other areas and locations of a gas turbine engine as well, particularly areas where the combined conditions of high temperature and significant vibratory motion are experienced. One or more embodiments of the present disclosure have been described. Nevertheless, it will be understood that various modifications may be made without departing from the spirit and scope of the invention. For example, different materials and seal configurations could be utilized, and seals in other locations may benefit from the disclosure coating. Accordingly, other embodiments are within the scope of the following claims.

What is claimed is:

1. A piston seal assembly for a gas turbine engine, comprising:
   a seal comprised of a nickel-based superalloy;
   a component in contact with the seal and defining a seal-counterface; and
   a coating on the seal at the seal-counterface, wherein the coating comprises a metal alloy binder phase and a hard particle phase distributed through the binder phase, wherein the hard particle phase comprises hard particles having a particle size of between 5 and 150 μm, and wherein the coating has a thickness of between 0.0005 in. and 0.005 in.

2. The assembly of claim 1, wherein the hard particle phase comprises particles of a material selected from the group consisting of $Cr_2O_3$, $Al_2O_3$, carbides, chromium carbides, silicon carbides and combinations thereof.

3. The assembly of claim 1, wherein the hard particle phase comprises particles of $Cr_2O_3$.

4. The assembly of claim 1, wherein the metal alloy binder phase comprises a Co—Cr—W alloy.

5. The assembly of claim 1, wherein the metal alloy binder phase contains between 28 and 32 wt. % chromium, between 3.5 and 5.5 wt. % of tungsten, between 0.9 and 1.4 wt. % carbon, up to 3.0 wt. % nickel, up to 2.0 wt. % silicon, up to 3.0 wt. % iron, up to 2.0 wt. % manganese, up to 1.5 wt. % molybdenum and balance cobalt.

6. The assembly of claim 1, wherein the coating contains between 60 and 80% volume of the metal alloy binder phase and between 20 and 40% volume of the hard particle phase.

7. The assembly of claim 1, wherein the seal comprises an age hardening austenitic nickel-based superalloy.

8. The assembly of claim 1, wherein the seal has non-contact surfaces that are not in contact with the component, and the coating is on the seal at the seal-counterface, and not on the non-contact surfaces.

9. The seal assembly of claim 1, wherein the component comprises two components, with the seal mounted between the two components to define two seal-counterfaces, and wherein the coating is on the seal at both of the two seal-counterfaces.

10. The assembly of claim 9, wherein the two components comprise a mid-turbine-frame (MTF) vane and an outer air seal.

11. The assembly of claim 1, wherein at least 85% volume of the particles have particle sizes between 10 and 20 μm.

12. A seal for a gas turbine engine, comprising a seal comprised of a nickel-based superalloy and a coating on the seal, wherein the coating comprises a metal alloy binder phase and a hard particle phase distributed through the binder phase, wherein the hard particle phase comprises hard particles having a particle size of between 5 and 150 μm, and wherein the coating has a thickness of between 0.0005 in. and 0.005 in.

13. The seal of claim 12, wherein the hard particle phase comprises particles of a material selected from the group consisting of $Cr_2O_3$, $Al_2O_3$, carbides, chromium carbides, silicon carbides and combinations thereof.

14. The seal of claim 12, wherein the hard particle phase comprises particles of $Cr_2O_3$.

15. The seal of claim 12, wherein the metal alloy binder phase comprises a Co—Cr—W alloy.

16. The seal of claim 12, wherein the metal alloy binder phase contains between 28 and 32 wt. % chromium, between 3.5 and 5.5 wt. % of tungsten, between 0.9 and 1.4 wt. % carbon, up to 3.0 wt. % nickel, up to 2.0 wt. % silicon, up to 3.0 wt. % iron, up to 2.0 wt. % manganese, up to 1.5 wt. % molybdenum and balance cobalt.

17. The seal of claim 12, wherein the coating contains between 60 and 80% volume of the metal alloy binder phase and between 20 and 40% volume of the hard particle phase.

18. The seal of claim 12, wherein at least 85% volume of the particles have particle sizes between 10 and 20 μm.

* * * * *